US012728721B2

(12) United States Patent
Shin et al.

(10) Patent No.: US 12,728,721 B2
(45) Date of Patent: Sep. 8, 2026

(54) DISCONNECTOR APPARATUS WITH LIMITED SLIP DIFFERENTIAL FUNCTION

(71) Applicant: Hyundai Transys Inc., Seosan-si (KR)

(72) Inventors: Bong Joo Shin, Hwaseong-si (KR); Jong Bae Ahn, Hwaseong-si (KR); Se Dong Yang, Hwaseong-si (KR); Sangheon Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 230 days.

(21) Appl. No.: 18/799,159

(22) Filed: Aug. 9, 2024

(65) Prior Publication Data

US 2025/0135879 A1 May 1, 2025

(30) Foreign Application Priority Data

Oct. 25, 2023 (KR) ........................ 10-2023-0144103

(51) Int. Cl.
*B60K 23/08* (2006.01)
*B60K 17/346* (2006.01)
(Continued)

(52) U.S. Cl.
CPC ...... *B60K 23/0808* (2013.01); *B60K 17/3465* (2013.01); *F16H 48/22* (2013.01); *B60K 2023/0841* (2013.01); *F16H 2048/204* (2013.01)

(58) Field of Classification Search
CPC ............ B60K 23/0808; B60K 17/3465; B60K 2023/0841; B60K 17/02; B60K 23/08;
(Continued)

(56) References Cited

U.S. PATENT DOCUMENTS 4,305,313 A * 12/1981 Konkle .................. F16H 48/22
74/606 R
4,785,926 A * 11/1988 Matson .................. B30B 15/10
192/48.612
(Continued)

FOREIGN PATENT DOCUMENTS

CN 119096066 A * 12/2024 ............ F16H 48/22
DE 68909581 T2 1/1994
(Continued)

OTHER PUBLICATIONS

Krüger, "Office Action for German Patent Application No. 10 2024 127 284.8", Apr. 11, 2025, German Patent and Trade Mark Office, Germany.

*Primary Examiner* — Drew J Brown
(74) *Attorney, Agent, or Firm* — Bridgeway IP Law Group, PLLC; Jihun Kim

(57) ABSTRACT

A disconnector apparatus with a limited slip differential function includes a casing, first and second pressure rings provided at two opposite sides while opposing each other at an interval in the casing and having first dog portions provided on outer-diameter portions thereof, and a clutch ring coupled to an outer-diameter portion of the casing and connected to a sleeve configured to be operated by an operation of an actuator device, in which the clutch ring moves in a meshing direction when the sleeve is operated by the actuator device, such that second dog portions provided on an inner-diameter portion of one end positioned in the casing mesh with first dog portions of the first and second pressure rings, such that four-wheel drive is implemented.

7 Claims, 5 Drawing Sheets

(51) Int. Cl.
*F16H 48/20* (2012.01)
*F16H 48/22* (2006.01)

(58) Field of Classification Search
CPC .... F16H 48/22; F16H 2048/204; F16H 48/20; F16H 48/38; F16H 48/34; F16H 48/40
See application file for complete search history.

(56) References Cited

U.S. PATENT DOCUMENTS

| | | | | |
|---|---|---|---|---|
| 4,811,628 | A * | 3/1989 | Winkam | F16H 48/08 475/86 |
| 5,125,876 | A * | 6/1992 | Hirota | F16H 48/08 475/238 |
| 6,436,002 | B1 * | 8/2002 | Ishikawa | F16H 48/295 475/231 |
| 6,524,211 | B2 * | 2/2003 | Okazaki | F16H 48/22 475/241 |
| 6,837,821 | B2 * | 1/2005 | Teraoka | F16H 48/30 475/233 |
| 6,949,047 | B2 * | 9/2005 | Okazaki | F16H 48/22 475/231 |
| 8,474,349 | B2 * | 7/2013 | Grogg | F16D 25/0638 192/48.604 |
| 9,644,726 | B2 * | 5/2017 | Cooper | F16H 48/38 |

FOREIGN PATENT DOCUMENTS

| | | | | |
|---|---|---|---|---|
| DE | 4427358 | A1 * | 2/1995 | F16H 48/08 |
| DE | 102005046409 | A1 | 4/2006 | |
| EP | 0379721 | A1 * | 8/1990 | F16H 48/22 |
| KR | 10-2006-0066806 | A | 6/2006 | |

* cited by examiner

DISCONNECTOR APPARATUS WITH LIMITED SLIP DIFFERENTIAL FUNCTION

CROSS-REFERENCE TO RELATED APPLICATIONS

This application claims priority to and the benefit of Korean Patent Application No. 10-2023-0144103 filed in the Korean Intellectual Property Office on Oct. 25, 2023, the entire contents of which are incorporated herein by reference.

TECHNICAL FIELD

The present invention relates to a disconnector apparatus including a differential restriction function.

BACKGROUND ART

In general, a disconnector apparatus refers to an apparatus capable of minimizing an unnecessary loss of power by switching power between two-wheel drive (2WD) and four-wheel drive (4WD) depending on a traveling situation.

A limited slip differential (LSD) refers to a device for restricting differential by using friction or the like when relative rotational motions occur on left and right driving wheels. The limited slip differential (LSD) may allow one side driving wheel to easily get out of a muddy road or puddle by transmitting a force to the other side driving wheel when one side driving wheel gets stuck in the muddy road or puddle. Further, the limited slip differential (LSD) prevents a slip of the wheel when a vehicle travels in corners, thereby ensuring traveling safety.

However, a device, in which a disconnector function and a limited slip differential function are integrated, has not been developed.

DOCUMENT OF RELATED ART

Patent Document (Patent Document 1) Korean Patent Application Laid-Open No. 10-2006-0066806 (published on Jun. 19, 2006)

SUMMARY OF THE INVENTION

The present invention has been made in an effort to solve the above-mentioned problem, and an object of the present invention is to provide a disconnector apparatus with a limited slip differential function, which is capable of switching power between two-wheel drive and four-wheel drive and limiting differential by applying a frictional force of a friction member to two opposite side gears when a rotational resistance difference occurs between two opposite driving wheels while a vehicle travels.

In order to achieve the above-mentioned object, the present invention provides a disconnector apparatus with a limited slip differential function, the disconnector apparatus including: a casing; first and second pressure rings provided at two opposite sides while opposing each other at an interval in the casing and having first dog portions provided on outer-diameter portions thereof; and a clutch ring coupled to an outer-diameter portion of the casing and connected to a sleeve configured to be operated by an operation of an actuator device, in which the clutch ring moves in a meshing direction when the sleeve is operated by the actuator device, such that second dog portions provided on an inner-diameter portion of one end positioned in the casing mesh with first dog portions of the first and second pressure rings, such that four-wheel drive is implemented.

In addition, the second dog portions may be provided at two opposite sides of the inner-diameter portion of one end of the clutch ring.

In addition, a pinion gear and two opposite side gears, which mesh with the pinion gear, may be provided in the first and second pressure rings, and the pinion gear may be rotatably coupled to a pinion shaft disposed between the two opposite side gears.

In addition, a cam part may be provided at an end of the pinion shaft, and the cam part may penetrate the pinion gear and be inserted into cam grooves provided in the first and second pressure rings.

In addition, the first and second pressure rings may be disposed between friction members provided at two opposite sides in the casing, and the two opposite friction members may be coupled to outer sides of the two opposite side gears.

In addition, the friction member is a multi-plate clutch.

In addition, when relative rotational torque is generated between the pinion shaft and the casing when a preset rotational resistance difference occurs between two opposite driving wheels while a vehicle travels, the cam part inserted into the cam groove may move in a differential limitation direction, the two opposite pressure rings may press the two opposite friction members while being pushed toward the two opposite friction members, and frictional forces of the two opposite friction members may be applied to the two opposite side gears, such that a limited differential state is implemented.

According to the present invention, the power switching may be performed from two-wheel drive (2WD) to four-wheel drive (4WD).

In addition, according to the present invention, the differential limitation may be performed by applying a frictional force of the friction member to the two opposite side gears when a rotational resistance difference occurs between the two opposite driving wheels while the vehicle travels.

In addition, according to the present invention, the disconnector function may improve electric power economy of the electric vehicle and perform the limited slip differential function when the vehicle turns at a high speed by applying the multi-plate clutch limited slip differential (mLSD), thereby ensuring traveling stability.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
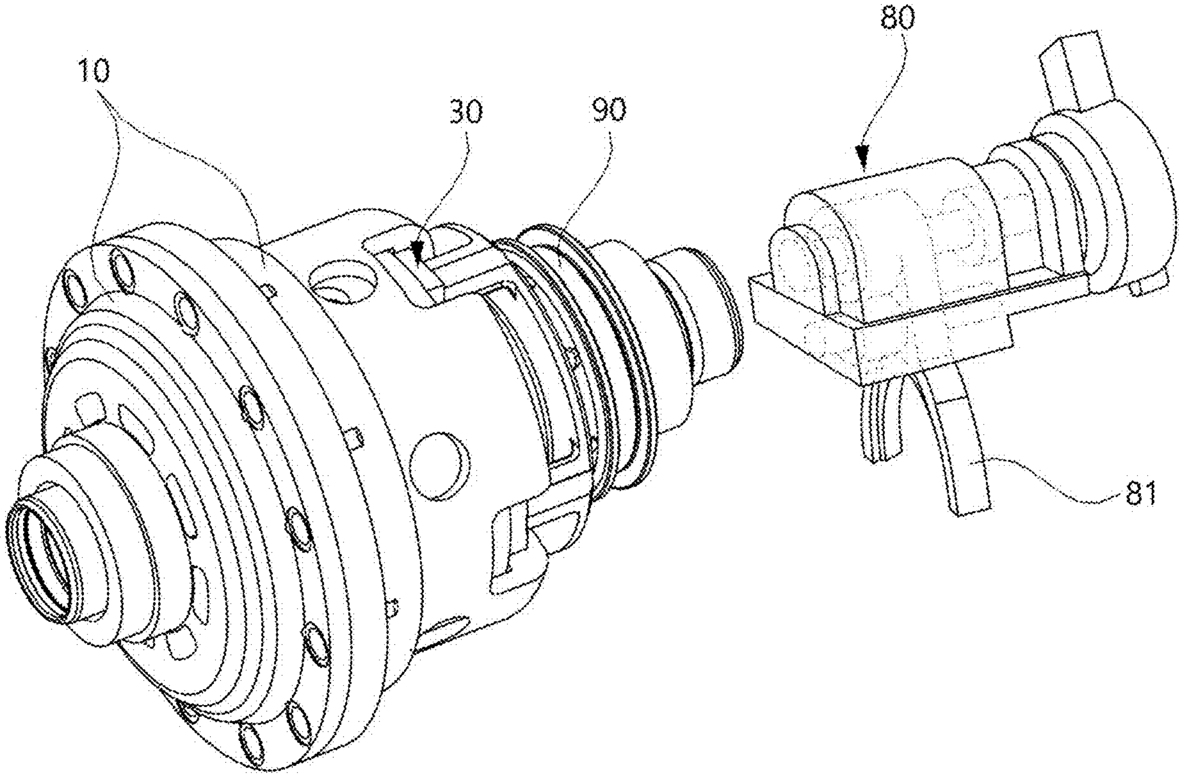
FIG. 1 is a perspective view of a disconnector apparatus with a limited slip differential function according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
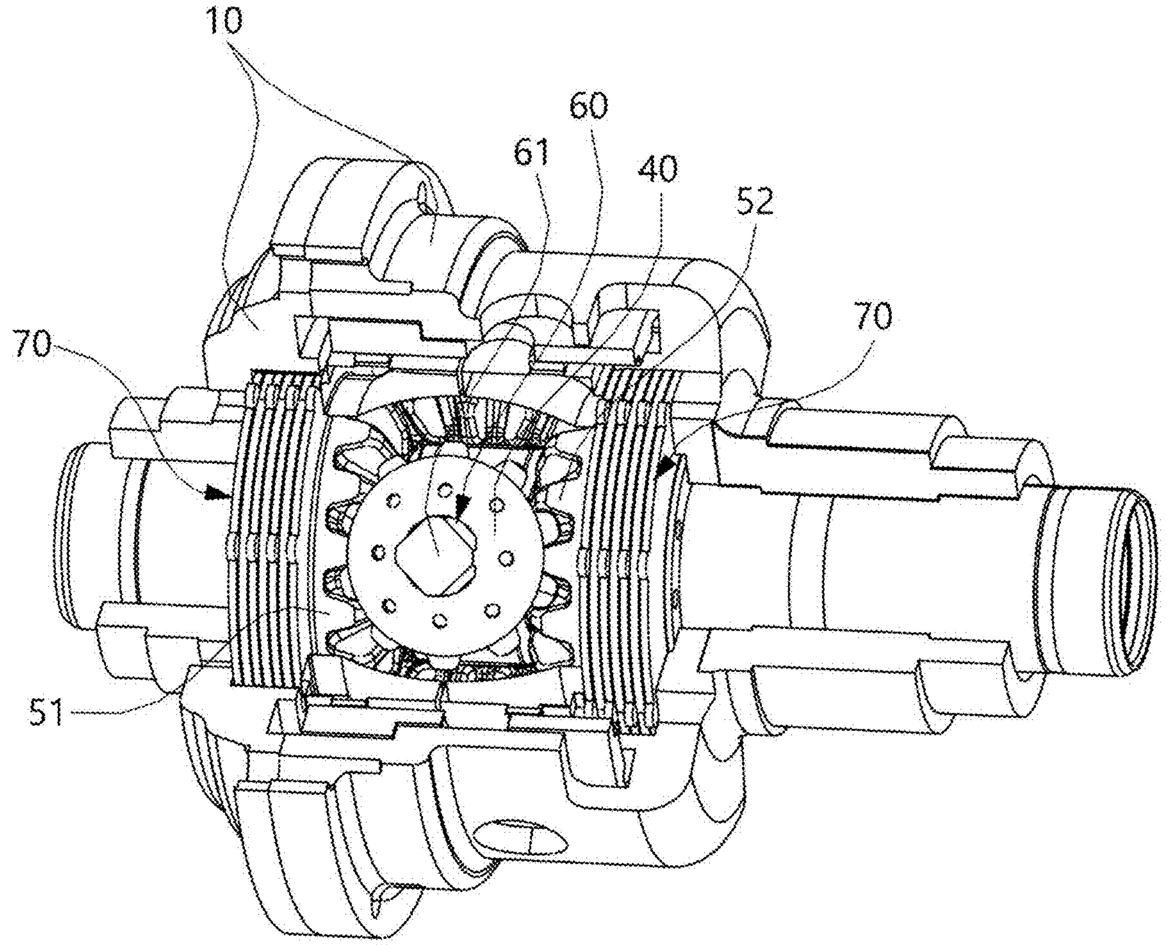
FIG. 2 is a partially cut-away perspective view of the disconnector apparatus with a limited slip differential function according to the exemplary embodiment of the present invention.
Figure 3:
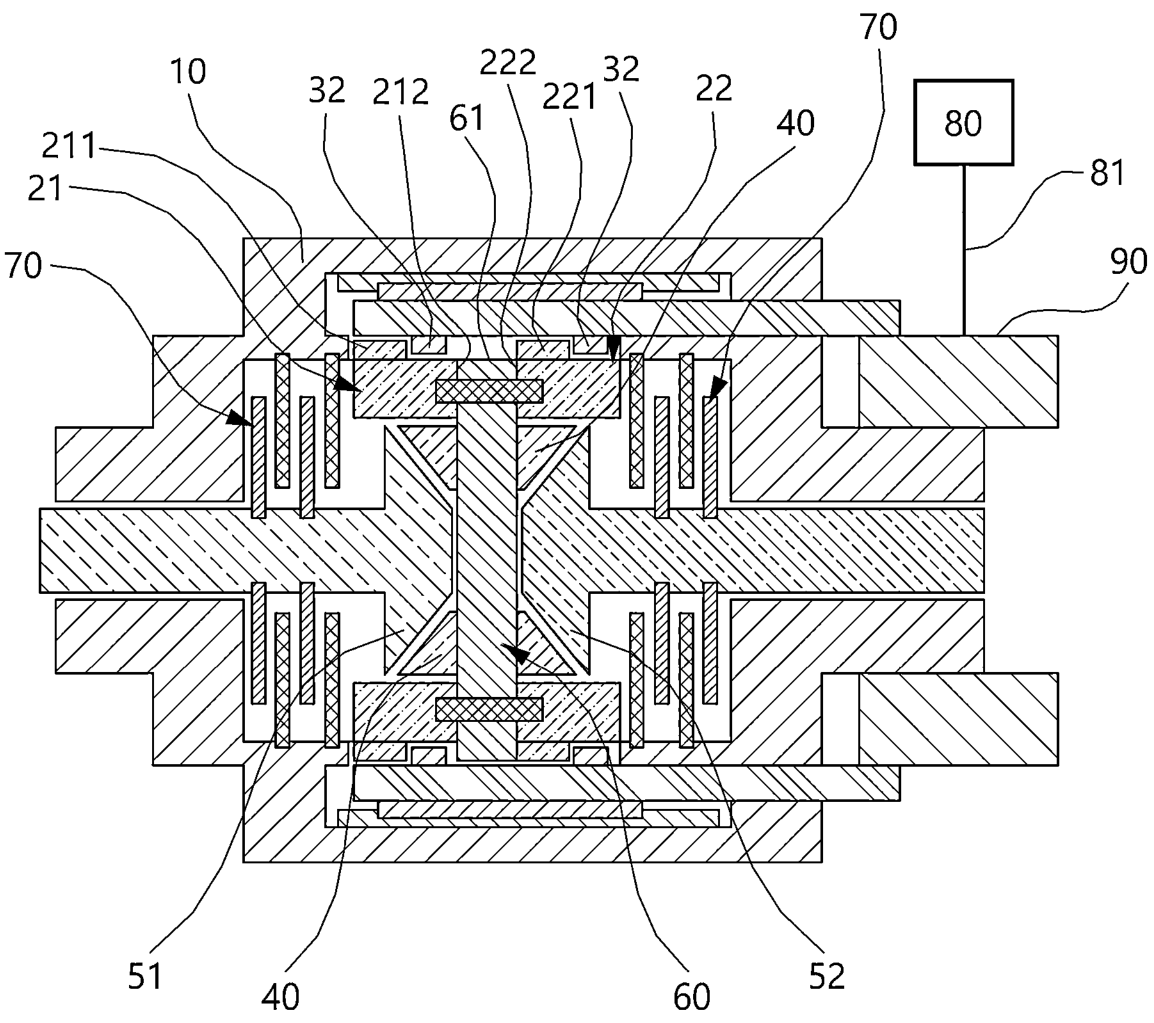
FIG. 3 is a cross-sectional side view of the disconnector apparatus with a limited slip differential function according to the exemplary embodiment of the present invention.
Figure 4:
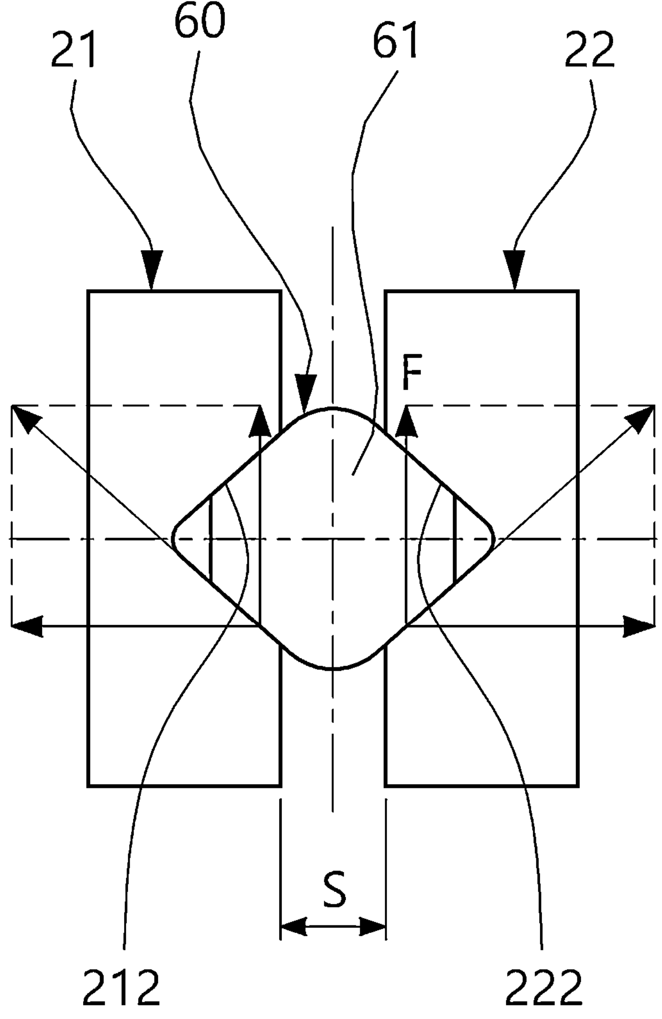
FIG. 4 is a view illustrating a state in which a cam part provided at an end of a pinion shaft according to the exemplary embodiment of the present invention is inserted into cam grooves provided in two opposite pressure rings.

FIG. 1 is a perspective view of a disconnector apparatus with a limited slip differential function according to an exemplary embodiment of the present invention, FIG. 2 is a partially cut-away perspective view of the disconnector apparatus with a limited slip differential function according to the exemplary embodiment of the present invention, FIG. 3 is a cross-sectional side view of the disconnector apparatus with a limited slip differential function according to the exemplary embodiment of the present invention, and FIG. 4 is a view illustrating a state in which a cam part provided at an end of a pinion shaft according to the exemplary embodiment of the present invention is inserted into cam grooves provided in two opposite pressure rings.

As illustrated in FIGS. 1 to 4, the present invention may include a disconnector apparatus and a multi-plate clutch limited slip differential (mLSD).

The disconnector apparatus may include a clutch ring 30 and an actuator device 80.

The multi-plate clutch limited slip differential (mLSD) may include first and second pressure rings 21 and 22, a pinion shaft 60, and friction members 70.

The present invention may include a casing 10, the first and second pressure rings 21 and 22, and the clutch ring 30. The casing 10 may be configured to be separable.

The first and second pressure rings 21 and 22 may be provided at two opposite sides to oppose each other at an interval S in the casing 10. The first and second pressure rings 21 and 22 may have first dog portions 211 and 221 provided on outer-diameter portions thereof.

Differential gears such as pinion gears 40 or side gears may be provided in the first and second pressure rings 21 and 22.

The clutch ring 30 may be connected to a sleeve 90. The sleeve 90 may be connected to the actuator device 80 by a fork 81.

The sleeve 90 coupled to an outer side of the casing 10 may be moved in a meshing direction along the casing 10 by an operation of the actuator device 80.

The clutch ring 30 connected to the sleeve 90 may be moved in the meshing direction by the movement of the sleeve 90.

Second dog portions 32 may be provided at two opposite sides of an inner-diameter portion of one end of the clutch ring 30 directed toward the first and second pressure rings 21 and 22.

During the meshing operation of the clutch ring 30, the second dog portions 32 may mesh with the first dog portions 211 and 221 respectively provided on the first and second pressure rings 21 and 22. Therefore, the four-wheel drive may be implemented.

One end of the clutch ring 20 directed toward the first and second pressure rings 21 and 22 may be positioned in the casing 10, and the other end of the clutch ring 20 directed toward the sleeve 90 may penetrate the casing 10 and be connected to the sleeve 90 positioned on the outer side of the casing 10.

The two opposite side gears, i.e., one side gear 51 and the other side gear 52, which are provided at two opposite left and right sides in the first and second pressure rings 21 and 22, may mesh with the pinion gears 40.

The pinion gears 40 may be rotatably coupled to the pinion shaft 60 disposed between one side gear 51 and the other side gear 52.

A cam part 61 may be provided at an end of the pinion shaft 60. The cam part 61 may penetrate the pinion gear 40 and be inserted into cam grooves 212 and 222 provided in the first and second pressure rings 21 and 22.

The cam part 61 may have a shape such as "〈〉". The cam grooves 212 and 222 may have shapes such as "〈〉".

The first and second pressure rings 21 and 22 may be disposed between the friction members 70 provided at the two opposite sides in the casing 10. The two opposite friction members 70 may be coupled to the outer sides of one side gear 51 and the other side gear 52. For example, the friction member 70 may be a multi-plate clutch.

The frictional forces of the two opposite friction members 70 may be applied to one side gear 51 and the other side gear 52 by the first and second pressure rings 21 and 22, such that the differential may be limited.

One side gear 51 may be connected to one side driving wheel (not illustrated), and the other side gear 52 may be connected to the other side driving wheel (not illustrated).

Next, an operation of the clutch ring of the present invention will be described.

Figure 5:
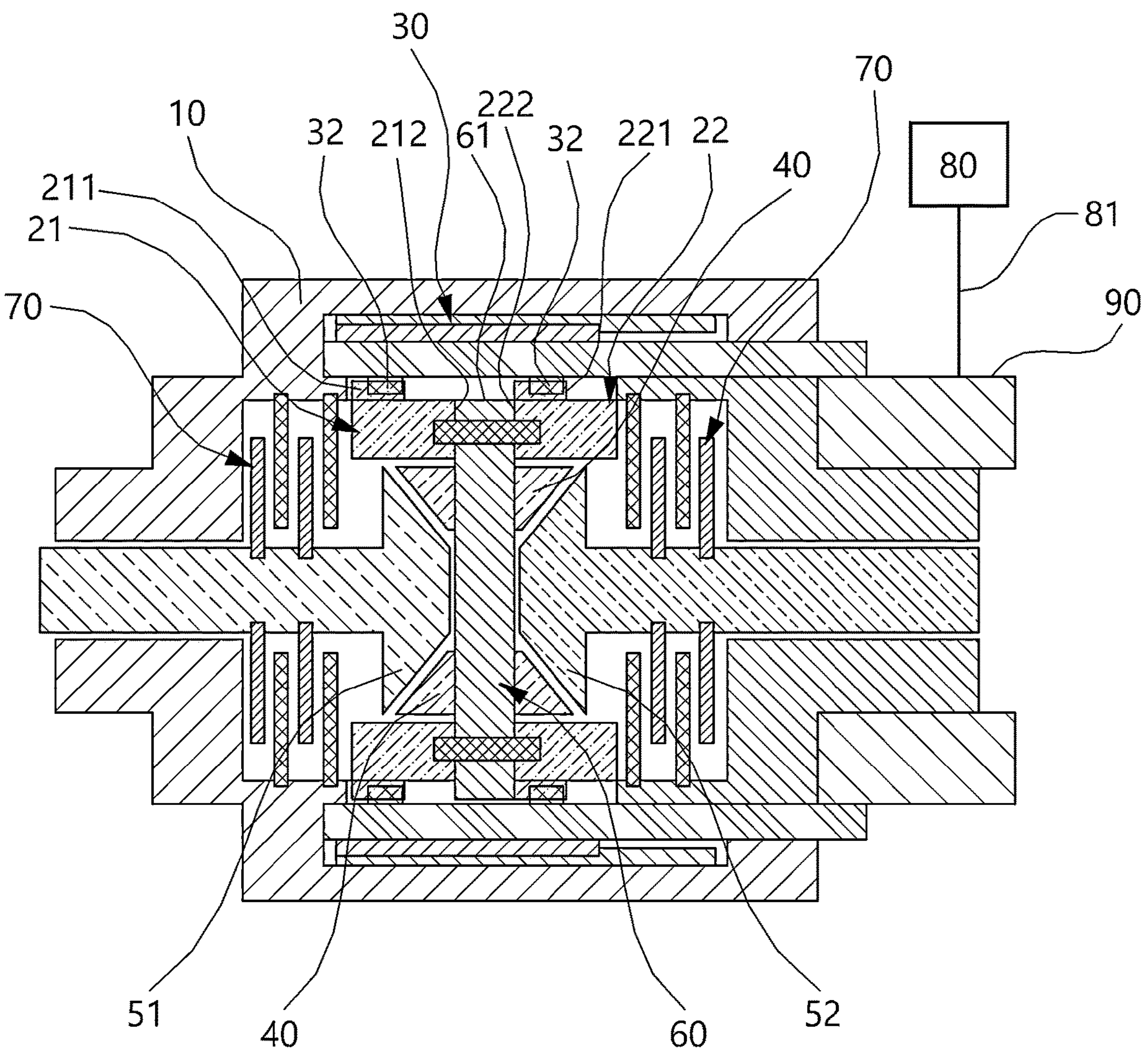
FIG. 5 is a view illustrating a state in which second dog portions of a clutch ring mesh with first dog portions of the two opposite pressure rings according to the exemplary embodiment of the present invention.

FIG. 5 is a view illustrating a state in which the second dog portions of the clutch ring mesh with the first dog portions of the two opposite pressure rings according to the exemplary embodiment of the present invention.

As illustrated in FIG. 5, in a two-wheel drive state in which the first dog portions 211 and 221 of the first and second pressure rings 21 and 22 and the second dog portions 32 of the clutch ring 30 are released, the second dog portions 32 provided at the two opposite sides of the inner-diameter portion directed toward the first and second pressure rings 21 and 22 of the clutch ring 30 mesh with the first dog portions 211 and 221 of the first and second pressure rings 21 and 22, such that a four-wheel drive state may be implemented.

Specifically, the sleeve 90 connected to the fork 81 may be moved in the meshing direction along the casing 10 by the operation of the actuator device 80.

The clutch ring 30 connected to the sleeve 90 is moved in the meshing direction by the movement of the sleeve 90, such that the second dog portions 32 of the clutch ring 30 may mesh with the first dog portions 211 and 221 of the first and second input rings 21 and 22. Therefore, the four-wheel drive may be implemented.

For example, in the four-wheel drive state, power of the drive motor (not illustrated) may be transmitted to the casing 10 through a ring gear (not illustrated) coupled to the outer side of the casing 10.

Next, the operation of limiting the differential of the present invention will be described.

As illustrated in FIGS. 3 to 5, in case that a rotational resistance difference occurs between the two opposite driving wheels (not illustrated) while the vehicle travels, relative rotational torque may be generated between the pinion shaft 60 and the casing 10.

The cam part 61 inserted into the cam grooves 212 and 222 is moved in a differential limitation direction F by the occurrence of the relative rotational torque, such that the interval S between the first and second pressure rings 21 and 22 may further increase. The first and second pressure rings 21 and 22 may press the two opposite friction members 70 by being pushed toward the two opposite friction members 70.

The two opposite friction members 70 are compressed by being pressed by the first and second pressure rings 21 and 22, such that the frictional forces of the two opposite friction members 70 may be applied to one side gear 51 and the other side gear 52. Therefore, the limited differential state may be implemented.

According to the present invention, in case that the relative rotational motions occur on the two opposite left and right driving wheels (not illustrated), the frictional forces of the two opposite friction members 70 are applied to one side gear 51 and the other side gear 52, such that the differential of the two opposite driving wheels (not illustrated) connected to the two opposite driving wheels is limited. Therefore, even though one side driving wheel gets stuck in a rough road, such as a muddy road or puddle, one driving wheel may easily escape from the rough road by applying a force to the other side driving wheel. In addition, the occurrence of the differential of the two opposite left and right driving wheels (not illustrated) is restricted while the vehicle travels in corners or travels on a rainy or snowy road, thereby ensuring traveling stability.

The present invention may be applied to electric vehicles such as dual motor type full-time 4WD electric vehicles (EVs) or the like.

According to the present invention described above, the power switching may be performed from two-wheel drive (2WD) to four-wheel drive (4WD). In addition, according to the present invention, the differential limitation may be performed by applying a frictional force of the friction member to the two opposite side gears when a rotational resistance difference occurs between the two opposite driving wheels while the vehicle travels. In addition, according to the present invention, the disconnector function may improve electric power economy of the electric vehicle and perform the limited slip differential function when the vehicle turns at a high speed by applying the multi-plate clutch limited slip differential (mLSD), thereby ensuring traveling stability.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A disconnector apparatus with a limited slip differential function, the disconnector apparatus comprising:

a casing;

first and second pressure rings disposed in the casing at two opposite sides, respectively, while facing each other at an interval, each of the first and second pressure rings having a first dog portion disposed on an outer-diameter portion thereof; and a clutch ring coupled to an outer-diameter portion of the casing and connected to a sleeve configured to be operated by an actuator device, wherein the clutch ring is configured to move in a meshing direction when the sleeve is operated by the actuator device to mesh second dog portions disposed on an inner-diameter portion of one end of the clutch ring positioned in the casing with the first dog portion of the first pressure ring and the first dog portion of the second pressure ring, to implement four-wheel drive.

2. The disconnector apparatus of claim 1, wherein the second dog portions are disposed at two opposite sides of the inner-diameter portion of the one end of the clutch ring, respectively.

3. The disconnector apparatus of claim 1, wherein a pinion gear and two opposite side gears, which are configured to mesh with the pinion gear, are disposed in the first and second pressure rings, and the pinion gear is rotatably coupled to a pinion shaft disposed between the two opposite side gears.

4. The disconnector apparatus of claim 3, wherein a cam part is disposed at an end of the pinion shaft, and the cam part penetrates the pinion gear and is disposed in cam grooves defined in the first and second pressure rings.

5. The disconnector apparatus of claim 4, wherein the first and second pressure rings are disposed between two friction members disposed at two opposite sides, respectively, in the casing, and each of the two friction members is coupled to an outer side of each of the two opposite side gears.

6. The disconnector apparatus of claim 5, wherein each of the two friction members is a multi-plate clutch.

7. The disconnector apparatus of claim 5, wherein when relative rotational torque is generated between the pinion shaft and the casing when a preset rotational resistance difference occurs between two opposite driving wheels while a vehicle travels, the cam part disposed in the cam grooves is configured to move in a differential limitation direction, the first and second pressure rings are configured to press the two friction members while being pushed toward the two friction members by the cam part moving in the differential limitation direction, and the two friction members are configured to thereby apply frictional forces of the two friction members to the two opposite side gears to implement a limited differential state.

* * * * *